US009067451B2

(12) United States Patent
Uyttendaele et al.

(10) Patent No.: US 9,067,451 B2
(45) Date of Patent: Jun. 30, 2015

(54) LASER MARKABLE SECURITY FILM

(75) Inventors: Carlo Uyttendaele, Mortsel (BE); Bart Aerts, Rumst (BE); Bart Waumans, Puurs (BE); Ingrid Geuens, Emblem (BE)

(73) Assignee: Agfa-Gevaert N.V., Mortsel (BE)

( * ) Notice: Subject to any disclaimer, the term of this patent is extended or adjusted under 35 U.S.C. 154(b) by 351 days.

(21) Appl. No.: 13/509,482

(22) PCT Filed: Dec. 17, 2010

(86) PCT No.: PCT/EP2010/070064
§ 371 (c)(1), (2), (4) Date: May 11, 2012

(87) PCT Pub. No.: WO2011/073383
PCT Pub. Date: Jun. 23, 2011

(65) Prior Publication Data

US 2012/0217736 A1 Aug. 30, 2012

Related U.S. Application Data

(60) Provisional application No. 61/287,713, filed on Dec. 18, 2009.

(30) Foreign Application Priority Data

Dec. 18, 2009 (EP) .................................... 09179799

(51) Int. Cl.

| | |
|---|---|
| ***B41M 3/14*** | (2006.01) |
| ***B44F 1/12*** | (2006.01) |
| ***B41M 5/00*** | (2006.01) |
| ***B32B 3/00*** | (2006.01) |

(Continued)

(52) U.S. Cl.
CPC ................ *B41M 5/267* (2013.01); *B41M 5/26* (2013.01); *B41M 2205/00* (2013.01); *B41M 2205/04* (2013.01); *B41M 2205/38* (2013.01)

(58) Field of Classification Search
None
See application file for complete search history.

(56) References Cited

U.S. PATENT DOCUMENTS 3,479,426 A 11/1969 De Smedt
3,578,845 A 5/1971 Brooks et al.
3,649,336 A 3/1972 Van Paesschen et al.

(Continued)

FOREIGN PATENT DOCUMENTS

AU 42586/89 4/1991
DE 3812454 10/1989

(Continued)

OTHER PUBLICATIONS

International Preliminary Report on Patentability in corresponding International Patent Application No. PCT/EP2010/070064, mailed Jun. 19, 2012.

(Continued)

*Primary Examiner* — Mark Ruthkosky
*Assistant Examiner* — Laura C Powers
(74) *Attorney, Agent, or Firm* — Leydig, Voit & Mayer, Ltd.

(57) ABSTRACT

A security film including, in order, a transparent biaxially oriented polyethylene terephthalate support (1), a subbing layer (2, 2') and a laser markable layer (3, 3') comprising a laser additive and one or more polymers selected from the group consisting of polystyrene, polycarbonate and styrene acrylonitrile.

17 Claims, 4 Drawing Sheets

(51) Int. Cl.
*B32B 7/00* (2006.01)
*B41M 5/26* (2006.01)

(56) References Cited

U.S. PATENT DOCUMENTS

| | | | | |
|---|---|---|---|---|
| 3,867,148 | A | 2/1975 | O'Keeffe et al. | |
| 4,082,901 | A | 4/1978 | Laridon et al. | |
| 4,096,933 | A | 6/1978 | Massa | |
| 4,223,918 | A | 9/1980 | Smoczynski | |
| 4,352,716 | A | 10/1982 | Schaible et al. | |
| 4,450,024 | A | 5/1984 | Haghiri-Tehrani et al. | |
| 4,480,177 | A | 10/1984 | Allen | |
| 4,506,916 | A | 3/1985 | Kuhl | |
| 4,544,181 | A | 10/1985 | Maurer et al. | |
| 4,552,383 | A | 11/1985 | Hoppe et al. | |
| 4,556,628 | A | 12/1985 | Greschner et al. | |
| 4,853,300 | A | 8/1989 | Pike | |
| 4,856,857 | A | 8/1989 | Takeuchi et al. | |
| 4,913,858 | A | 4/1990 | Miekka et al. | |
| 5,142,383 | A | 8/1992 | Mallik | |
| 5,145,212 | A | 9/1992 | Mallik | |
| 5,164,227 | A | 11/1992 | Miekka et al. | |
| 5,171,625 | A | 12/1992 | Newton | |
| 5,223,081 | A | 6/1993 | Doan | |
| 5,354,613 | A | 10/1994 | Quintens et al. | |
| 5,407,893 | A | 4/1995 | Koshizuka et al. | |
| 5,478,645 | A * | 12/1995 | Chang | 428/347 |
| 5,527,758 | A | 6/1996 | Uyttendaele et al. | |
| 5,589,317 | A | 12/1996 | Defieuw et al. | |
| 5,753,352 | A | 5/1998 | Vanmaele et al. | |
| 5,804,026 | A | 9/1998 | Vogt | |
| 5,863,859 | A | 1/1999 | Uytterhoeven et al. | |
| 5,869,140 | A | 2/1999 | Blohowiak et al. | |
| 6,010,817 | A | 1/2000 | Van Damme et al. | |
| 6,090,747 | A | 7/2000 | Dronzek | |
| 6,210,777 | B1 | 4/2001 | Vermeulen et al. | |
| 6,254,971 | B1 | 7/2001 | Katayose et al. | |
| 6,283,378 | B1 | 9/2001 | Welling | |
| 6,328,342 | B1 | 12/2001 | Belousov et al. | |
| 6,514,367 | B1 | 2/2003 | Leighton | |
| RE38,321 | E | 11/2003 | Uyama et al. | |
| 6,693,657 | B2 | 2/2004 | Carroll, Jr. et al. | |
| 6,803,114 | B1 | 10/2004 | Vere et al. | |
| 7,033,677 | B2 * | 4/2006 | Busch et al. | 428/515 |
| 7,097,899 | B2 | 8/2006 | Daems et al. | |
| 7,541,088 | B2 | 6/2009 | Bennett et al. | |
| 8,293,450 | B2 | 10/2012 | Kasperchik et al. | |
| 2001/0016426 | A1 | 8/2001 | Lee et al. | |
| 2002/0136582 | A1 | 9/2002 | Verdyck | |
| 2003/0068491 | A1 | 4/2003 | Otaki et al. | |
| 2003/0075275 | A1 | 4/2003 | Kubota | |
| 2003/0183695 | A1 | 10/2003 | Labrec et al. | |
| 2004/0180520 | A1 | 9/2004 | Janke | |
| 2005/0087606 | A1 | 4/2005 | McCumber | |
| 2005/0095408 | A1 * | 5/2005 | LaBrec et al. | 428/195.1 |
| 2006/0127623 | A1 | 6/2006 | Ishida | |
| 2006/0193021 | A1 | 8/2006 | Ishimoto et al. | |
| 2006/0216872 | A1 | 9/2006 | Arai et al. | |
| 2007/0017647 | A1 | 1/2007 | Habik et al. | |
| 2007/0026585 | A1 | 2/2007 | Wong et al. | |
| 2008/0192103 | A1 | 8/2008 | Daems et al. | |
| 2008/0238086 | A1 * | 10/2008 | Geuens et al. | 283/110 |
| 2009/0032602 | A1 | 2/2009 | Nishi et al. | |
| 2009/0063058 | A1 | 3/2009 | Rehm et al. | |
| 2009/0187435 | A1 | 7/2009 | Carr et al. | |
| 2010/0201115 | A1 | 8/2010 | Geuens | |
| 2011/0204616 | A1 | 8/2011 | Geuens | |
| 2011/0266788 | A1 | 11/2011 | Geuens | |
| 2012/0231240 | A1 | 9/2012 | Uyttendaele et al. | |

FOREIGN PATENT DOCUMENTS

| | | |
|---|---|---|
| DE | 102007037982 | 2/2009 |
| EP | 0544035 | 6/1993 |
| EP | 0552656 | 7/1993 |
| EP | 0622217 | 11/1994 |
| EP | 0761468 | 3/1997 |
| EP | 0792756 | 9/1997 |
| EP | 0866750 | 9/1998 |
| EP | 1170630 | 1/2002 |
| EP | 1632362 | 3/2006 |
| EP | 1852269 | 11/2007 |
| EP | 1852270 | 11/2007 |
| EP | 2042576 | 4/2009 |
| GB | 811066 | 3/1959 |
| GB | 1439478 | 6/1976 |
| GB | 1441591 | 7/1976 |
| GB | 2132136 | 7/1984 |
| GB | 2279610 | 12/1999 |
| GB | 2338678 | 12/1999 |
| GB | 2400074 | 10/2004 |
| JP | 58-172676 | 9/1988 |
| JP | 63-215732 | 9/1988 |
| JP | 03-270993 | 12/1991 |
| JP | 04-123191 | 4/1992 |
| JP | 07-089225 | 4/1995 |
| JP | 08-300810 | 11/1996 |
| JP | 10-119163 | 5/1998 |
| JP | 00-085282 | 3/2000 |
| JP | 00-251108 | 9/2000 |
| JP | 05-293396 | 10/2005 |
| JP | 07-268712 | 10/2007 |
| WO | WO 99/24934 | 5/1999 |
| WO | WO 99/51446 | 10/1999 |
| WO | WO 00/18591 | 4/2000 |
| WO | WO 01/54917 | 8/2001 |
| WO | WO 03/055638 | 7/2003 |
| WO | 2006/042714 | 4/2006 |
| WO | WO 2006/042714 A1 | 4/2006 |
| WO | WO 02/074548 | 9/2006 |
| WO | WO 2007/023410 | 3/2007 |
| WO | WO 2007/027619 | 3/2007 |
| WO | WO 2007/132214 | 11/2007 |
| WO | WO 2008/084315 | 7/2008 |
| WO | WO 2008/110892 | 9/2008 |
| WO | WO 2009/037330 | 3/2009 |
| WO | 2009/063058 | 5/2009 |
| WO | WO 2009/063058 A1 | 5/2009 |
| WO | WO 2009063058 A1 * | 5/2009 |
| WO | WO 2011/073383 | 6/2011 |
| WO | WO 2011/073384 | 6/2011 |

OTHER PUBLICATIONS

EP Search Report for EP07116829.8, Aug. 20, 2008, 5 pp.

EP Search Report for EP08172496.5, Feb. 25, 2009, 6 pp.

Int'l Search Report for PCT/EP2008/062501, Jan. 7, 2009, 2 pp.

Int'l Search Report for PCT/EP2008/062512, Jan. 26, 2009, 2 pp.

Int'l Search Report for PCT/EP2009/053905, Jul. 15, 2009, 4 pp.

Int'l Search Report for PCT/EP2009/065882, Feb. 15, 2010, 4 pp.

Int'l Search Report for PCT/EP2010/069299, Apr. 8, 2011, 2 pp.

Int'l Search Report for PCT/EP2010/070064, Apr. 8, 2011, 3 pp.

Int'l Search Report for PCT/EP2010/070065, Apr. 7, 2011, 2 pp.

"Adhesion and Bonding," *Encyclopedia of Polymer and Engineering*, Mark et al., ed., pp. 476-577 (1985).

International Preliminary Report on Patentability in International Application No. PCT/EP2010/070065, mailed Jun. 19, 2012.

* cited by examiner

LASER MARKABLE SECURITY FILM

CROSS-REFERENCE TO RELATED APPLICATIONS

This patent application is the U.S. national stage of International Patent Application No. PCT/EP 2010/070064, filed Dec. 17, 2010, which claims the benefit of European Patent Application No. 09179799.3, filed Dec. 18, 2009. and of U.S. Provisional Patent Application No. 61/287713, filed Dec. 18, 2009, the disclosers of which are herein incorporated by reference.

TECHNICAL FIELD

This invention relates to security films containing a laser markable layer and security documents containing them.

BACKGROUND ART

Laser marking and laser engraving are well-known techniques which are frequently used in preparing identification cards and security documents. However in literature, laser engraving is often incorrectly used for laser marking. In laser marking, a colour change is observed by the local heating of material causing carbonization. Gray shades can be obtained by varying the beam power. In laser engraving, the material is removed by ablation.

It is frequently mentioned in the literature that polycarbonate, PBT and ABS as polymers are laser-markable as such, i.e. in the absence of a so-called "laser additive". However, laser additives are often added even in the case of these polymers in order to improve the laser markability further. A laser additive is a compound absorbing light at the wavelength of the laser used, usually at 1064 nm (Nd:YAG), and converting it to heat.

Carbon black can be used as a laser additive, however carbon black has a degree of colour which is sufficient to be visible prior to application of the laser beam and that can be unsightly or interfere with the distinctness of the mark after the laser beam has been applied. These disadvantages lead to a search for more efficient "colourless" laser additives. For example, U.S. Pat. No. 6,693,657 (ENGELHARD CORP) discloses a YAG laser marking additive based on a calcined powder of co-precipitated mixed oxides of tin and antimony which will produce a black mark contrasting with the surrounding area when exposed to YAG laser energy but prior thereto does not impart an appreciable colour to the surrounding area or cause a significant change in the performance of the material in which it has been added. Generally, the alternative laser additives are based on heavy metals making them less desirable from an ecological viewpoint.

Today, the most common plastic used in laser marking identification cards and security documents is a foil of extruded polycarbonate. However, polycarbonate foils have a number of disadvantages. The most important ones are their brittleness, leading to security cards getting broken when bended, and their lack of inertness towards organic solvents, opening possibilities to falsify a security card.

Polyethylene terephthalate (PET) exhibits a high solvent resistance, a high flexibility and is less expensive than polycarbonate, but exhibits no or very poor laser markability.

EP 866750 A (SCHREINER ETIKETTEN) discloses laser-markable films for labels based on a white PET film which bears a black coating. Laser irradiation ablates the black coating and uncovers the white background. This structure enables good high-contrast white-on-black inscriptions and drawings.

U.S. Pat. No. 7,541,088 (MITSUBISHI POLYESTER FILM) discloses a biaxially oriented, heat-set, at least two-layer coextruded film formed from polyethylene terephthalate (PET) or polyethylene 2,6-naphthalate (PEN) including a base layer and at least one outer layer. The base layer includes a white pigment and a laser absorber which has been coated with a carbonizing polymer. It is disclosed at col. 3, lines 64-66 that only the combination of the laser marking additive with a white pigment and with a specific coextruded layer structure leads to effective laser marking. The opaque coextruded layer structure prevents any security print, such as e.g. guilloches, present on a foil beneath to be visible through the laser markable layer structure.

WO 01/54917 (SIPIX IMAGING) discloses a heat sensitive recording material for thermal imaging comprising a transparent support sheet having a thermal slip layer disposed on one surface of the support and a heat sensitive color-producing layer on the opposite surface of the support wherein the color is formed from leuco dyes.

U.S. Pat. No. 5,407,893 (KONICA) discloses an ID card material comprising a thermal transfer image-receiving layer, and provided thereon, a substrate layer and a writing layer in this order, the substrate layer including a biaxially oriented polyester film layer having a thickness of 300 to 500 μm and a resin layer having a thickness of 30 to 500 μm selected from the group consisting of a polyolefin layer, a polyvinyl chloride type resin film layer and an ABS resin film layer.

EP1852269 (TECHNO POLYMER) discloses a laminate for laser marking which is useful for forming displays or indications, comprising a layer (A) and a layer (B) laminated on at least one side of layer (A), which layer (A) comprises a white or black coloring laser-marking thermoplastic resin, which layer (B) comprises a transparent thermoplastic resin and has a light transmittance of not less than 70% in the single layer, and the transparent thermoplastic resin in the layer (B) being subjected to anti-blocking treatment.

There is therefore a need for a transparent laser markable security film having a high solvent resistance and flexibility.

DISCLOSURE OF INVENTION

Summary of Invention

In order to overcome the problems described above, preferred embodiments of the present invention provide a security film as defined by Claim 1. The security film allowed a surprisingly simple way to include security print and printed data on the inside of a security document to be readable through a laser markable layer thereby making falsification very difficult.

Further advantages and embodiments of the present invention will become apparent from the following description.

BRIEF DESCRIPTION OF DRAWINGS

In the drawings FIG. 1 to FIG. 4 the following numbering is adhered to:

1, 1', 6=PET-C;
2, 2'=subbing layer (SL);
3, 3'=laser markable layer (LML);
4, 4', 9=thermo adhesive layer (TAL)
5=opaque core e.g. white PETG;
7=adhesive layer;
8=transparent PETG; and
10, 10', 10"=security print & printed information.

Figure 1:
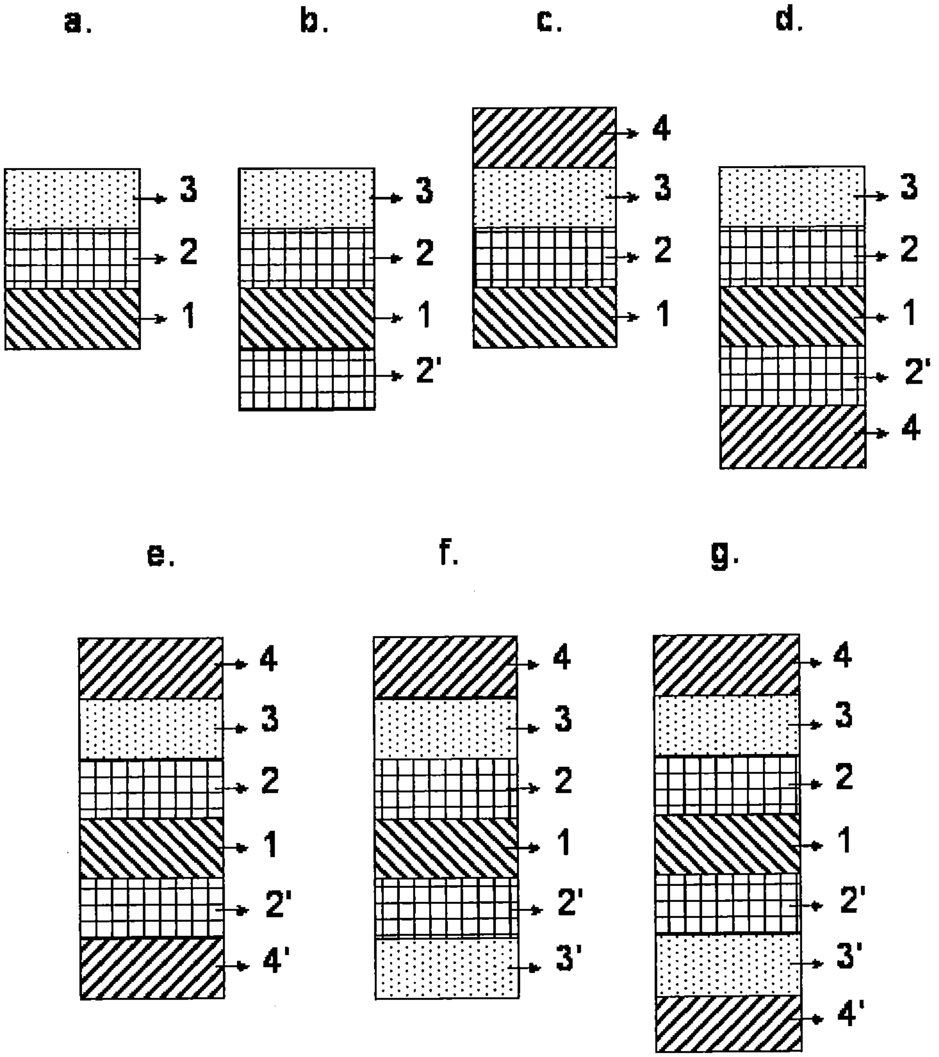

FIG. 1 shows examples of possible layer structures of the security film according to the present invention.

Figure 2:
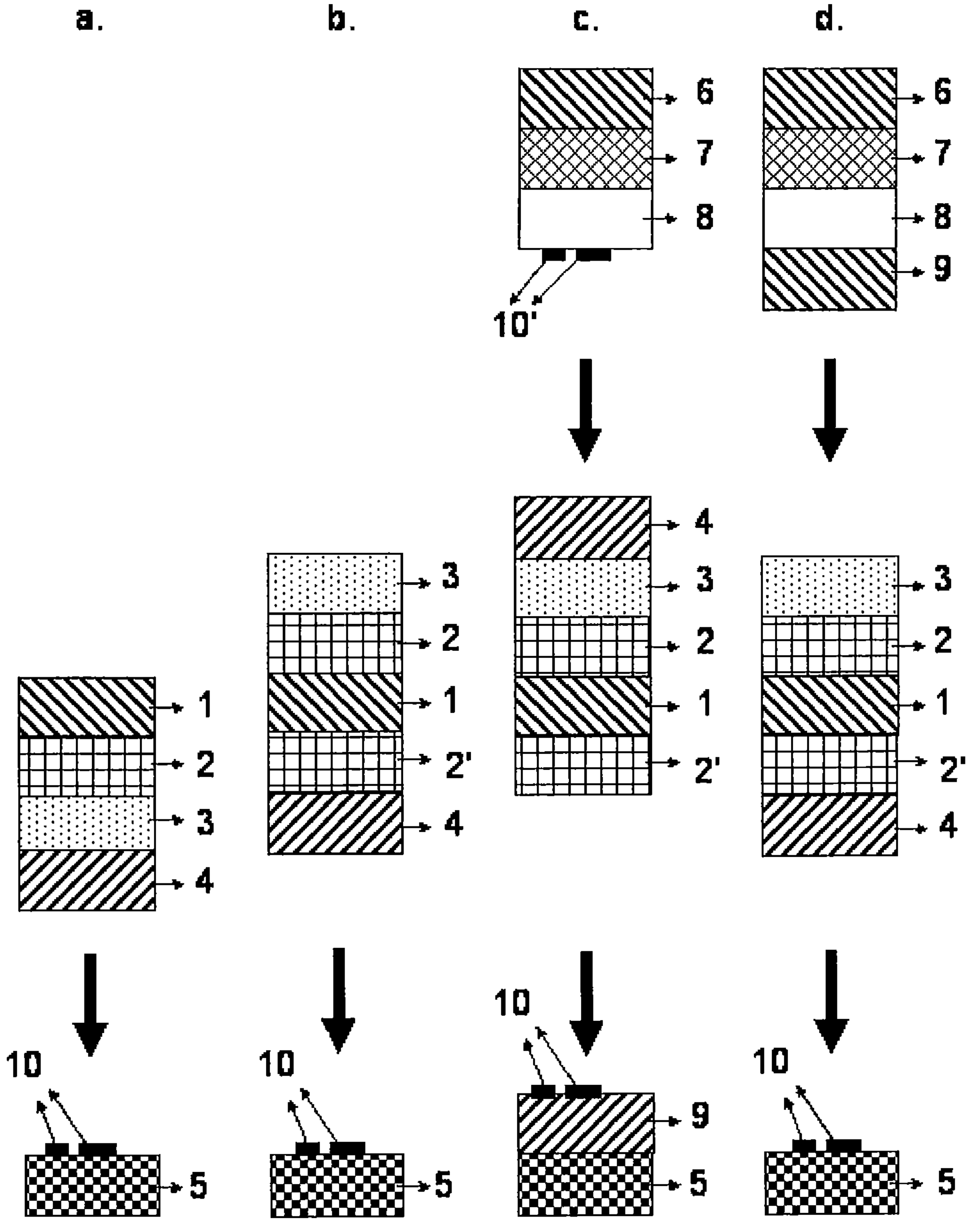

FIG. 2 shows how the security films of the invention can be used for manufacturing security documents.

Figure 3:
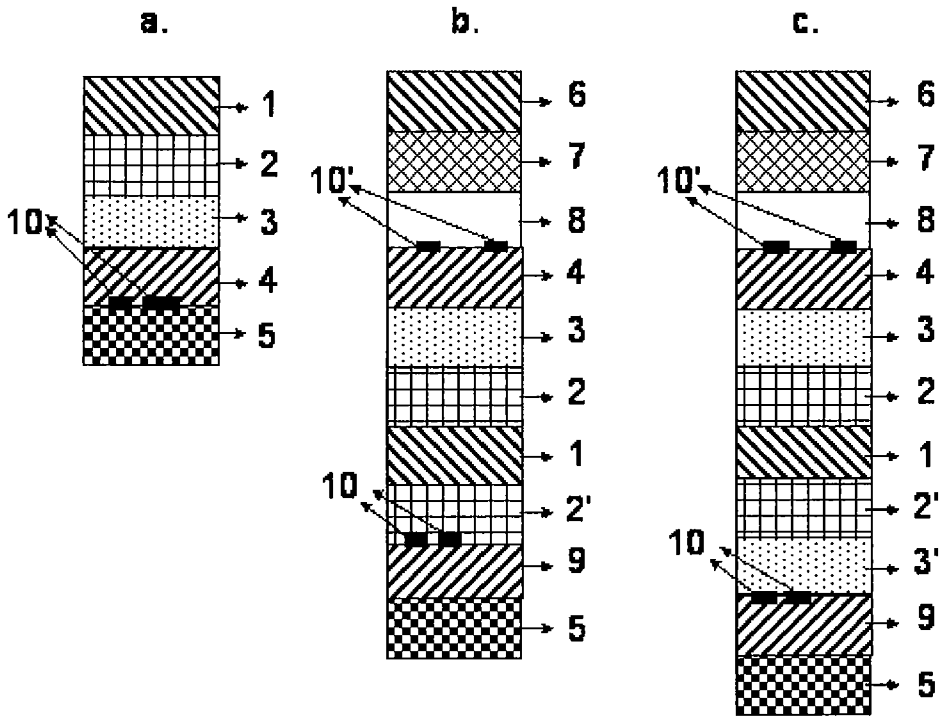

FIG. 3 shows examples of single side laser markable security documents.

Figure 4:
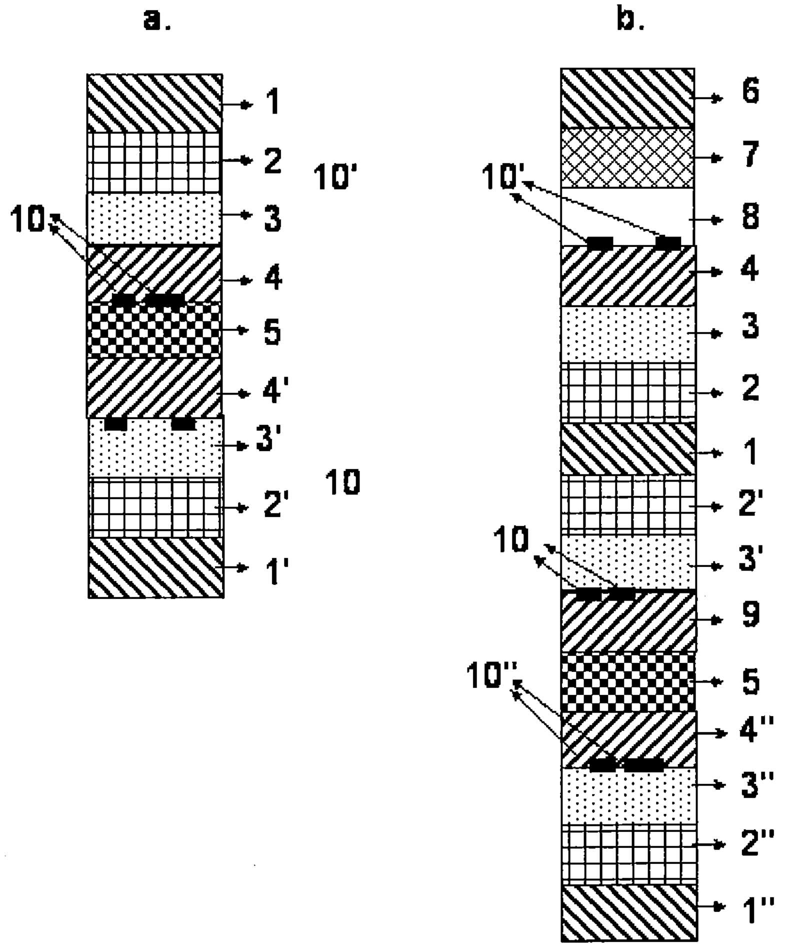

FIG. 4 shows examples of double side laser markable security documents.

DEFINITIONS

The terms "support" and "foil", as used in disclosing the present invention, mean a self-supporting polymer-based sheet, which may be associated with one or more adhesion layers e.g. subbing layers. Supports and foils are generally manufactured through extrusion.

The term "layer", as used in disclosing the present invention, is considered not to be self-supporting and is manufactured by coating it on a support or a foil.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) is used in the production of cards.

"PET-C" is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website: http://www.consilium.europa.eu/prado/EN/glossaryPopup.html.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "chlorinated ethylene", as used in disclosing the present invention, means ethylene substituted with at least one chlorine atom e.g. vinyl chloride, vinylidene chloride, 1,2-dichloro-ethylene, trichloroethylene and tetrachloroethylene. 1,2-dichloro-ethylene, trichloroethylene and tetrachloroethylene Trichloroethylene and tetrachloroethylene are all much more difficult to polymerize than vinyl chloride or vinylidene chloride.

Security Films

A transparent security film according to the present invention includes, in order:

a) a biaxially oriented polyethylene terephthalate support SUP;

b) a subbing layer SL1; and c) a laser markable layer LML comprising:

i) a laser additive; and ii) a polymer selected from the group consisting of polystyrene, polycarbonate and styrene acrylonitrile.

Such a configuration is shown in it simplest form in FIG. 1.*a*, wherein a laser markable layer 3 was coated on the subbing layer 2 present on the PETC-support SUP. The layer configurations shown in the FIGS. 1 to 4 are merely illustrative. For example, a second subbing layer may present between the subbing layer 2 and the laser markable layer 3 in FIG. 1.*a*, or, for example, the laser markable layer may be split up in two laser markable layers having the same or a different composition, e.g. a different content of laser additive.

In a preferred embodiment of the security film, the polymer in the laser markable layer LML is polystyrene.

In a preferred embodiment of the security film, the laser additive is carbon black. The carbon black preferably has an average particle size of less than 100 nm. The laser additive is preferably present in amount of less than 0.08 wt % based on the total weight of laser markable polymer(s).

The security film may, as shown by FIG. 1.*c*, further contain a thermo adhesive layer TAL (4) on top of the laser markable layer LML (3).

In one embodiment, the security film further contains a second subbi layer SL2 (e.g. 2' in FIG. 1.*b*) on the support SUP on the other side of the support SUP than the side having the subbing layer SL1 (2), and may have a thermo adhesive layer TAL (e.g. 4 in FIG. 1.*d*) on top of the subbing layer SL2 (2').

The thermo adhesive layer TAL preferably contains a copolymer of vinylchloride, vinylacetate and vinylalcohol.

In a preferred embodiment of the security film, the polyethylene terephthalate support SUP has a thickness of 100 μm or less.

In another preferred embodiment, the security film contains a second laser markable layer present on the other side of the support SUP than the side having the laser markable layer LML. This configuration is shown by FIGS. 1.*f* and 1.*g* wherein two laser markable layers 3 and 3' were coated on subbing layers 2 respectively 2' present on both sides of the PETC support 1. A thermo adhesive layer (4, 4') may be present on one or both of the laser markable layers.

A method for preparing a security film according to the present invention includes the steps of:

a) providing a transparent biaxially oriented polyethylene terephthalate support SUP having a subbing layer SL1; and b) coating a laser markable layer LML on the subbing layer SL1 using a composition comprising: i) one or more polymers selected from the group consisting of polystyrene, polycarbonate and styrene acrylonitrile; and ii) a laser additive.

Security Documents

A security document according to the present invention includes al least one security film according to the present invention. Such a security document can be used for identification of the person mentioned on the security document.

FIG. 2 shows how security documents having one or more laser markable layers on one side of the opaque core 5 can be prepared using the security film according to the present invention. Possible results of single side laser markable security documents prepared by a lamination as shown by FIG. 2 are shown in FIG. 3. FIG. 4 shows examples of double side laser markable security documents which can be symmetrical (FIG. 4.*a*) or asymmetrical (FIG. 4.*b*) in view of the opaque core 5. The opaque core is preferably a white or light coloured foil, e.g. opaque PETG, on which the dark laser markings are clearly visible.

In FIG. 2.*a*, the security film of FIG. 3.*c* is laminated with the thermo adhesive layer 4 onto an opaque core 5 containing some security print 10, e.g. guilloches. It is also possible to have the laser markable layer 3 as the outermost layer by laminating the security film of FIG. 1.*d* with the thermo adhesive layer 4 onto an opaque core 5 containing some security print 10. Alternatively the laser markable layer 3 may also be protected by an overlay, preferably having PETC (6) as an outermost foil as shown in FIGS. 2.*c* and 2.*d*. For lamination of this overlay, a thermo adhesive layer is preferably present on either the laser markable layer (4 in FIG. 2.*c*) or the overlay (9 in FIG. 2.*d*). The overlay may contain further layers or foils, e.g. a subbing layer 7 and a transparent PETG foil 8, and optionally contain some security print or printed information 10', for example printed by inkjet or thermal dye sublimation.

An advantage of the transparent PETC-support 1 in the security film is that security print 10 on an opaque core 5 is visible through the laser markable layer 3, as shown e.g. in FIGS. 3.*a* and 3.*b*. In FIG. 3.*c*, two laser markable layers 3 and 3' are present in the security document. It has also been observed that higher optical densities are created by laser marking in the laser markable layer which is the nearest to an opaque layer or foil, such as e.g. the opaque core 5. By controlling the thickness of the support SUP (1) in the security film, a ghost image can be created in the laser markable layer 3 of the security document of FIG. 3.*c*.

In a preferred embodiment, the security document contains a white support or layer, preferably in close contact with the security film, more preferably in contact with the laser markable layer LML. An adhesive layer, preferably a thermo adhesive layer TAL, may be present between the white support or layer and the laser markable layer LML.

The security documents may also be laser markable on both sides of the core 5 as shown in FIG. 4, by including laser markable layers (3, 3', 3") on both sides of the opaque core 5. Security print and printed information (10, 10', 10") can be present in or on different layers and foils on both sides of the opaque core 5.

The security document may be a "smart card", meaning an identification card incorporating an integrated circuit as a so-called electronic chip. In a preferred embodiment the security document is a so-called radio frequency identification card or RFID-card.

The security document is preferably an identification card selected from the group consisting of an identity card, a security card, a driver's licence card, a social security card, a membership card, a time registration card, a bank card, a pay card and a credit card. In a preferred embodiment, the security document is a personal identity card.

The security document preferably has a format as specified by ISO 7810. ISO 7810 specifies three formats for identity cards: ID-1 with the dimensions 85.60 mm×53.98 mm, a thickness of 0.76 mm is specified in ISO 7813, as used for bank cards, credit cards, driving licences and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contact less integrated circuits then a larger thickness is tolerated, e.g. 3 mm according to ISO 14443-1.

To prevent forgeries of security documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

The security document according to the present invention may contain other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

A combination with one of the above security features increases the difficulty for falsifying a security document.

Supports

The support of the security film according to the present invention is a PET-C support. Such a biaxially stretched polyethylene terephthalate support has excellent properties of dimensional stability, organic solvent resistance and flexibility The manufacturing of polyester supports is well-known in the art of preparing suitable supports for silver halide photographic films. For example, GB 811066 (ICI) teaches a process to produce biaxially oriented films.

The support of the security film according to the present invention should be sufficiently thick to be self-supporting, but thin enough to be flexed, folded or creased without cracking. Preferably, the support has a thickness of between about 10 μm and about 200 μm, more preferably between about 10 μm and about 100 μm, most preferably between about 30 μm and about 65 μm.

In a preferred embodiment, PET-C is also used for the core of a security document, in which case it is preferably opaque.

Subbing Layers

In the present invention, the PET-C support is combined with a subbing layer containing a polymer preferably based on a polyester, a polyester-urethane or a copolymer of a chlorinated ethylene, more preferably based on vinylidene chloride. Preferably at least 25 wt %, more preferably at least 30% and most preferably at least 45 wt % of vinylidene chloride monomer is present in the polymer based on the total weight of the polymer.

The application of subbing layers is well-known in the art of manufacturing polyester supports for silver halide photographic films. For example, the preparation of such subbing layers is teached by U.S. Pat. No. 3,649,336 (AGFA) and GB 1441591 (AGFA).

The step of biaxially stretching the polyethylene terephthalate support is preferably performed with the subbing layer contiguous with the polyethylene terephthalate support during at least part of the biaxial stretching process. The preferred stretching process includes the steps of: longitudinally stretching the polyethylene terephthalate support; applying a composition comprising a polyester, a polyester-urethane or a copolymer of a chlorinated ethylene to the longitudinally-stretched polyethylene terephthalate support to provide a subbing layer of the composition contiguous with the longitudinally-stretched polyethylene terephthalate support; and transversally stretching the longitudinally-stretched polyethylene terephthalate support.

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment of the security film according to the present invention, the subbing layer has a dry thickness of no more than 2 μm or 200 mg/m$^2$.

Laser Markable Layers

The transparency of the security film and the small thickness of the laser markable layers are important advantages which open up more options for composing the layer configuration of a security document, e.g. applying security print between the core and the laser markable layer.

Commercially available laser markable foils, such as the most commonly used polycarbonate foils, have a thickness of at least 50 μm, while in the security film according to the present invention the thickness of the laser markable layer may surprisingly be even less than 25 μm and then still capable of delivering sufficient optical density. The combination of the laser markable layer with a transparent PETC support brings the further advantages of solvent resistance and flexibility, which are two major shortcomings of polycarbonate foils.

The polymers suitable for laser marking, i.e. carbonization, usually include polycarbonate (PC), polybutylene terephthalate (PBT), polyvinyl chloride (PVC), polystyrene (PS) and copolymers thereof, such as e.g. aromatic polyester-carbonate and acrylonitrile butadiene styrene (ABS). However, in order to obtain a sufficient optical density by laser marking in the relatively thin laser markable layers of the security film according to the present invention, it was found that only a few polymers were suitable and that the presence of a laser additive was imperative.

The polymer suitable for laser marking of the security film according to the present invention is selected from the group consisting of polystyrene, polycarbonate and styrene acrylonitrile. A mixture of two or more of these polymers may also be used.

In a preferred embodiment of the security film according to the present invention, the laser markable layer contains polystyrene. Polystyrene was observed to deliver the highest optical densities by laser marking and also exhibited the highest laser sensitivity.

Laser markable layers based on styrene acrylonitrile polymers are less safe since toxic acrylonitrile is released during laser marking.

The colour change in the polymeric materials is accelerated by the addition of a “laser additive”, a substance which absorbs the laser light and converts it to heat.

Suitable laser additives include antimony metal, antimony oxide, carbon black, mica (sheet silicate) coated with metal oxides and tin-antimony mixed oxides. In WO 2006/042714, the dark coloration of plastics is obtained by the use of additives based on various phosphorus-containing mixed oxides of iron, copper, tin and/or antimony.

Suitable commercially available laser additives include mica coated with antimony-doped tin oxide sold under the trade name of Lazerflair™ 820 and 825 by MERCK; copper hydroxide phosphate sold under the trade name of Fabulase™ 322 by BUDENHEIM; aluminium heptamolybdate sold under the trade name of AOM™ by HC STARCK; and antimony-doped tin oxide pigments such as Engelhard Mark-It™ sold by BASF.

In a preferred embodiment of the security film according to the present invention, the laser markable layer contains carbon black particles. This avoids the use of heavy metals in manufacturing these security documents. Heavy metals are less desirable from an ecology point of view and may also cause problems for persons having a contact allergy based on heavy metals.

Suitable carbon blacks include Special Black 25, Special Black 55, Special Black 250 and Farbruss™ FW2V all available from EVONIK; Monarch™ 1000 and Monarch™ 1300 available from SEPULCHRE; and Conductex™ 975 Ultra Powder available from COLUMBIAN CHEMICALS CO.

The use of carbon black pigments as laser additives may lead to an undesired background colouring of the security document precursor. For example, a too high concentration of carbon black in a laser markable layer in security document having a white background leads to grey security documents. A too low concentration of carbon black slows down the laser marking or requires a higher laser power leading to undesirable blister formation. Both problems were solved in the present invention by using carbon black particles having a small average particle size and present in a low concentration.

The numeric average particle size of the carbon black particles is preferably smaller than 300 nm, preferably between 5 nm and 250 nm, more preferably between 10 nm and 100 nm and most preferably between 30 nm and 60 nm. The average particle size of carbon black particles can be determined with a Brookhaven Instruments Particle Sizer BI90plus based upon the principle of dynamic light scattering. The measurement settings of the BI90plus are: 5 runs at 23° C., angle of 90°, wavelength of 635 nm and graphics=correction function.

For avoiding grey background colouring of security document, carbon black is preferably present in a concentration of less than 0.08 wt %, more preferably present in a concentration of less than 0.08 wt %, and most preferably present in the range 0.01 to 0.03 wt %, all based on the total weight of the laser markable polymer(s).

Adhesive Layers

In manufacturing security documents, hot lamination is the most common lamination method used and is generally preferred over cold lamination. Hot laminators use a heat-activated adhesive that is heated as it passes through the laminator. The downside to hot laminators is that a thermosensitive layer may not be capable to handle the heat required to apply the lamination. Cold laminators use a pressure-sensitive adhesive that does not need to be heated. The laminator uses rollers that push the sheets of lamination together. Cold laminators are faster and easier to use than hot laminators, and do not cause discoloration of thermosensitive layers.

The lamination temperature to prepare security documents according to the present inventions is preferably no higher than 180° C., more preferably no higher than 170° C. and most preferably no more than 160° C.

In the security films shown in FIGS. 1 to 4 each time a thermo adhesive layer was used, however nothing prevents the use of a pressure-sensitive adhesive layer or foil instead of the thermo adhesive layer in any of the embodiments shown by FIGS. 1 to 4. A combination of pressure-sensitive and thermo sensitive adhesive layers and foils may also be used in the security films and security documents according to the present invention.

Suitable compositions for these pressure-sensitive and thermo sensitive adhesive layers and foils in the security films and security documents according to the present invention are well-known to one skilled in the art.

A preferred hot melt foil which is positioned e.g. between the security film and an opaque core just prior to lamination is a polyurethane foil.

Contrary to biaxially oriented polyethylene terephthalate, a non-oriented PETG layer or foil softens rapidly near the glass transition temperature and can thus also be used for adhesive purposes as illustrated, for example, in US 2009032602 (TOYO BOSEKI).

Suitable thermo adhesive compositions are also disclosed in WO 2009/063058 (AGFA), A preferred thermo adhesive layer is based on a hydroxyl-functional, partially-hydrolyzed vinyl chloride/vinyl acetate resin available under the trade name of UCAR™ VAGD Solution vinyl resin from Dow Chemical Company.

Polymeric Overlays

The security document according to the present invention preferably has at least one polymer overlay on top of the laser markable layer. The security document may have several polymeric overlays on top of each other, for example, each containing some security features or information applied by imaging techniques such as ink-jet printing, intaglio printing, screen printing, flexographic printing, driographic printing, electrophotographic printing, electrographic printing, embossing and offset printing.

Suitable polymeric overlays which are laminated or coated include cellulose acetate propionate or cellulose acetate butyrate, polyesters such as polyethylene terephthalate and polyethylene naphthalate, polyamides, polycarbonates, polyimides, polyolefins, poly(vinylacetals), polyethers and polysulphonamides.

In a preferred embodiment of the security document according to the present invention, the polymeric overlay is polyvinyl chloride, polycarbonate or polyester. The polyester is preferably polyethylene terephthalate (PET) or polyethylene terephthalate glycol (PETG), more preferably PET-C.

EXAMPLES

Materials

All materials used in the following examples were readily available from standard sources such as ALDRICH CHEMICAL CO. (Belgium) and ACROS (Belgium) unless otherwise specified. The "water" used in the example was deionized water.

CCE is DIOFAN™ A658, a polyvinylidenechloride-methacrylate-itaconic acid copolymer from SOLVAY.

KIESELSOL™ 100F is a 36% aqueous dispersion of colloidal silica available from BAYER:

MERSOLAT™ H is 76% aqueous paste of a sodium pentadecyl-sulfonate from BAYER.

Mersol is a 0.6% solution of MERSOLAT™ H in water.

SPECIAL BLACK 25 is a carbon black having a primary particle size of about 56 nm and BET Surface area of 45 $m^2/g$ available from EVONIK(DEGUSSA).

PC01 is an abbreviation used for polycarbonate Apec™ 2050 available from BAYER.

PS01 is an abbreviation used for Empera™171M, a polystyrene available from INEOS.

SAN01 is an abbreviation used for a styrene-acrylonitrile copolymer available as DOW XZ 9518600 from DOW CHEMICAL. A 10% solution of this polymer in MEK has a viscosity of 7.1 mPa·s at 22° C.

PVB01 is an abbreviation used for the polyvinyl butyral polymer S LEC™ BL 5 HP available from SEKISUI.

BS is an abbreviation used for a 10 wt % solution in MEK of the silicon oil

Baysilon™ OI A available from BAYER and used as a surfactant.

PC01-sol is 20 wt % solution of PC01 in MEK containing also 0.025 wt % of BS.

PS01-sol is 20 wt % solution of PS01 in MEK containing also 0.025 wt % of BS.

PS02-sol is 30 wt % solution of PS01 in MEK.

SAN01-sol is 20 wt % solution of SAN01 in MEK containing also 0.025 wt % of BS.

PVB01-sol is 20 wt % solution of PC01 in MEK containing also 0.025 wt % of BS.

MEK is an abbreviation used for methylethylketon.

Mitsubishi White PET is a 75 μm white PET support WO175D027B available from MITSUBISHI.

Opaque PETG core is a 500 μm opaque PETG core.

Lazerflair™ 825 is a mica coated with antimony-doped tin oxide sold from MERCK.

Bayhydrol™ UH2558 is Cosolvent free aliphatic anionic polyurethane dispersion (containing ca 37.2% solid) based on a polyesterurethane of isoforondiisocyanate, hexanediol and adipinic acid from BAYER.

Paresin is a dimethyltrimethylolmelamine formaldehyde resin available under the trade name PAREZ™ RESIN 613 from American Cyanamid Company.

DR274 is a 10% aqueous solution of copolymer of 60% poly(methylsilylsesquixane)silylepoxy 60/40 available as TOSPEARL™ 120 from GENERAL ELECTRIC.

DR270 is an aqueous solution containing 2.5 wt % of DOWFAX™ 2A1 and 2.5 wt % of Surfynol™ 420.

DOWFAX™ 2A1 is a surfactant (CASRN 12626-49-2) from DOW CHEMICAL.

Surfynol™ 420 is a 2,4,7,9-Tetramethyl-5-decyne-4,7-diol-bispolyoxyethylene ether surfactant from AIR PRODUCTS & CHEMICALS.

Zylar™ 631 is a copolymer of styrene, butadiene and methyl methacrylate from INEOS NOVA SERVICES BV.

TPO is an abbreviation used for a 10 wt % solution in MEK of 2,4,6-trimethylbenzoyl-diphenyl-phosphineoxide available under the trade name Darocur™ TPO from CIBA SPECIALTY CHEMICALS.

Sartomer™ CD561 is alkoxylated hexanediol diacrylate from SARTOMER. PEDOT/PSS is a 1.2% aqueous dispersion of poly(3,4-ethylene-oxythiophene)/poly(styrene sulphonic acid) (1:2.46 by weight) produced as described in U.S. Pat. No. 5,354,613 (AGFA).

VIN1 is a 30 wt % solution in water of a copolymer of vinylidene chloride, methyl acrylate and itaconic acid (88: 10:2 by weight).

Kelzan™ S is a xanthan gum from MERCK & CO., Kelco Division, USA, which according to Technical Bulletin DB-19 is a polysaccharide containing mannose, glucose and glucuronic repeating units as a mixed potassium, sodium and calcium salt.

Zonyl™ FSO100 is a fluorosurfactant, more specific a block copolymer of polyethyleneglycol and polytetrafluoroethylene with the structure: $F(CF_2CF_2)_yCH_2CH_2O(CH_2CH_2O)_xH$, where x=0 to ca. 15 and y=1 to ca. 7 from DUPONT.

Poligen™ WE7 is a 40% aqueous latex of oxidized polyethylene from BASF.

PMMA is a 20% dispersion of 0.1 μm diameter polymethylmethacrylate spherical particles.

UCAR™ VAGD is a 90/4/6 wt % copolymer of vinylchloride/vinylacetaat/vinylalcohol available from UNION CARBIDE.

Measurement Methods

Optical Density

The optical density was measured in reflection using a spectrodensitometer Type 504 from X-RITE using a visual filter.

Example 1

This example illustrates how a security film in accordance with the present invention can be prepared and used for preparing a security document.

Preparation of PET-C Support PET1

A coating composition SUB-1was prepared by mixing the components according to Table 2 using a dissolver.

TABLE 2

| Components of SUB-1 | wt % |
|---|---|
| deionized water | 62.0 |
| a 30% by weight aqueous dispersion of CCE | 21.3 |
| KIESELSOL ™ 100F | 16.6 |
| a 3.7 wt % aqueous solution of MERSOLAT ™ H wt % aqueous solution) | 0.1 |

A 1100 μm thick polyethylene terephthalate sheet was first longitudinally stretched and then coated with the coating composition SUB-1to a wet thickness of 8 μm. After drying, the longitudinally stretched and coated polyethylene terephthalate sheet was transversally stretched to produce a 63 μm thick sheet. The resulting layer was transparent and glossy.

Preparation of Laser Additive Dispersions

All concentrated laser additive dispersions LAD-1 to LAD-4 were prepared in the same manner. The pigment Special Black™ 25 and a polymer were mixed using a dissolver in the organic solvent MEK in order to obtain a composition according to Table 3. Subsequently this mixture was milled in a roller mill using steatite-beads of 1 cm diameter for seven days at a rotation speed set at 150 rpm. After milling, the dispersion was separated from the beads using a filter cloth. The weight % (wt %) of the components in Table 3 are based on the total weight of the composition.

TABLE 3

| | Concentrated Laser Additive dispersions | | | |
|---|---|---|---|---|
| wt % of: | LAD-1 | LAD-2 | LAD-3 | LAD-4 |
| Special Black ™ 25 | 5.0 | 5.0 | 5.0 | 5.0 |
| PC01 | 20.0 | — | — | — |
| PS01 | — | 20.0 | — | — |
| SAN01 | — | — | 20.0 | — |
| PVB01 | — | — | — | 20.0 |
| MEK | 75.0 | 75.0 | 75.0 | 75.0 |

The obtained laser additive dispersions LAD-1 to LAD-4 were then further diluted according to Table 4 to a concentration of 2,000 ppm of the carbon black pigment versus the polymer, in order to obtain respectively the laser additive dispersions LAD-1B to LAD-4B.

TABLE 4

| | Laser additive dispersions | | | |
|---|---|---|---|---|
| g of component: | LAD-1B | LAD-2B | LAD-3B | LAD-4B |
| LAD-1 | 0.5 | — | — | — |
| LAD-2 | — | 0.5 | — | — |
| LAD-3 | — | — | 0.5 | — |
| LAD-4 | — | — | — | 0.5 |
| PC01-sol | 62.5 | — | — | — |
| PS01-sol | — | 62.5 | — | — |
| SAN01-sol | — | — | 62.5 | — |
| PVB01-sol | — | — | — | 62.5 |

Preparation of Security Films

The coating compositions CC-1 to CC-5 were prepared by dilution of the laser additive dispersions LAD-1 to LAD-4 with the components according to Table 5.

TABLE 5

| | Coating compositions | | | | |
|---|---|---|---|---|---|
| wt % of: | CC-1 | CC-2 | CC-3 | CC-4 | CC-5 |
| LAD-1B | 1 | 1 | — | — | — |
| LAD-2B | — | — | 1 | — | — |
| LAD-3B | — | — | — | 1 | — |
| LAD-4B | — | — | — | — | 1 |
| PC01-sol | 37 | — | — | — | — |
| PS01-sol | — | 37 | 37 | — | — |
| SAN01-sol | — | — | — | 37 | — |
| PVB01-sol | — | — | — | — | 37 |

The coating compositions CC-1 to CC-5 were then coated with an Elcometer Bird Film Applicator (from ELCOMETER INSTRUMENTS) on the subbed PET-C support PET1 at a coating thickness of 200 μm and subsequently dried for 15 minutes in oven at 80° C. to respectively deliver the security films SF-1 to SF-5.

The coating compositions CC-1 to CC-5 were also coated with an Elcometer Bird Film Applicator (from ELCOMETER INSTRUMENTS) on the Mitsubishi White PET at a coating thickness of 200 μm and subsequently dried for 15 minutes in oven at 80° C. to respectively deliver the security films SFW-1 to SFW-5.

Security Documents and Results

The security films SF-1 and SFW-1, with the coated layers of CC-1 in security films SF-1 and SFW-1 facing each other, were then laminated onto a 500 μm opaque PETG core to deliver the security document SD-1. The lamination was performed using an Oasys OLA6/7 plate laminator with the settings: LPT=205° C., LP=40, Hold=150 sec, HPT=130° C., HP=40 and ECT=50° C.

The security documents SD-2 to SD-5 were prepared in the same manner as SD-1 by using the security films SF-2 and SFW-2 to respectively security films SF-5 and SFW-5, with the exception that the lamination temperature LPT was set to 160° C.

A test image containing a wedge with different grey-levels (six squares of 9×9 mm) was laser marked on the security documents SD-1 to SD-5, using a Rofin RSM Powerline E laser (10 W) with settings 29 ampere and 22 kHz. The maximum optical density was measured in square 6 (RGB-values=12 of this area in the bitmap-image). The results are shown in Table 6.

TABLE 6

| Security documents | Dmax |
|---|---|
| SD-1 | 1.10 |
| SD-2 | 0.40 |
| SD-3 | 1.49 |
| SD-4 | 1.05 |
| SD-5 | 0.42 |

From Table 6, it should be clear that only polystyrene, polycarbonate and styrene acrylonitrile lead to high Dmax while polyvinylbutyral did not. Security document SD-2 shows that the polymer used in the laser additive dispersion and in the rest of the coating composition should be the same.

Example 2

This example illustrates that carbon black is much more efficient than other pigments for laser marking a layer containing polystyrene.

Preparation of Laser Additive Dispersion LAD-5B

A concentrated laser additive dispersion LAD-5 was prepared in the same manner as LAD-2 except that carbon black as pigment was replaced. 0.16 g of the pigment Lazerflair™ 825 and 15.78 g of polystyrene were mixed using a dissolver in 85.30 g of MEK. Subsequently this mixture was milled in a roller mill using steatite-beads of 1 cm diameter for seven days at a rotation speed set at 150 rpm. After milling, the dispersion was separated from the beads using a filter cloth.

Using the 20 wt % polystyrene solution PS01-sol, the obtained laser additive dispersion LAD-5 was then further diluted to a concentration of 10,000 ppm of the pigment Lazerflair™ 825 versus the polystyrene, in order to obtain the laser additive dispersions LAD-5B.

Preparation of Security Films

Coating compositions CC-6 and CC-7 with LAD-2B respectively LAD-5B were prepared in exactly the same manner as in EXAMPLE 1. Subsequently, both coating compositions CC-6 and CC-7 were coated in the same way as in EXAMPLE 1 on a Mitsubishi White PET support using the Elcometer Bird Film Applicator (from ELCOMETER INSTRUMENTS) to deliver the security films SFW-6 respectively SFW-7.

Security Documents and Results

The security films SFW-6 and SFW-7 were then each laminated on a 500 μm opaque PETG core to deliver the security documents SD-6 and SD-7 using the hot roll laminator at a lamination temperature of 160° C. and inserting a silicon based paper (Codor-carrier No 57001310 from CODOR) to prevent sticking of the laser markable layer of the security films SFW-6 and SFW-7 to the laminator rolls.

A test image containing a wedge with different grey-levels (six squares of 9×9 mm) was laser marked on the security documents SD-6 and SD-7, using a Rofin RSM Powerline E laser (10 W) with settings 29 ampere and 22 kHz. The maximum optical density was measured in square 6 (RGB-values=12 of this area in the bitmap-image).

The maximum optical density Dmax was determined for the security documents SD-6 and SD-7. The results are shown in Table 7.

TABLE 7

| Security documents | Pigment | Dmax |
|---|---|---|
| SD-6 | Lazerflair ™ 825 | 0.70 |
| SD-7 | Carbon black | 1.66 |

From Table 7, it should be clear that carbon black is much more efficient for laser marking polystyrene layers.

Example 3

This example illustrates how a ghost image can be made by laser marking using a double side laser markable security film.

Preparation of PET-C Support PET2

A coating composition SUB-2 was prepared by mixing the components according to Table 8 using a dissolver.

TABLE 8

| Component | wt % |
|---|---|
| Water | 77.87 |
| Resorcine | 0.99 |
| Bayhydrol ™ UH2558 | 18.55 |
| Paresin | 0.57 |
| DR274 | 0.68 |
| DR270 | 1.34 |

A 1100 μm thick polyethylene terephthalate sheet was first longitudinally stretched and then coated on both sides with the coating composition SUB-2 to a wet thickness of 10 μm. After drying, the longitudinally stretched and coated polyethylene terephthalate sheet was transversally stretched to produce a 63 μm thick sheet PET2 coated with a transparent and glossy subbing layer.

Preparation of Laser Additive Dispersion LAD-6B

A concentrated carbon black dispersions LAD-6 was prepared by dissolving 300.0 g of PS02-sol in a vessel containing 127.5 g of MEK using a DISPERLUX™ disperser (from DISPERLUX S.A.R.L., Luxembourg).and 22.5 g of Special Black 25 was added to the solution and stirred for 30 minutes. The vessel was then connected to a NETZSCH ZETAMILL filled having its internal volume filled for 50% with 0.4 mm yttrium stabilized zirconia beads ("high wear resistant zirconia grinding media" from TOSOH Co.). The mixture was circulated over the mill for 1 hour at a rotation speed in the mill of about 10.4 m/s (3,000 rpm). 290 g of the concentrated laser additive dispersion LAD-6 was recovered.

8.0 g of the concentrated laser additive dispersion LAD-6 was then added to a plastic bottle of 2,000 mL containing 659.0 g of MEK and 333.0 g of PS02-sol. This mixture was put onto a roller mill without using beads for 1 hour at a rotation speed set at 150 rpm to deliver the laser additive dispersion LAD-6B containing 2,000 ppm of Special Black 25.

Preparation of Double Side Laser Markable Security Film SF-6

The coating compositions CC-8 and CC-9 were prepared by mixing the components in the order according to Table 9.

TABLE 9

| | Coating Compositions | |
|---|---|---|
| wt % of | CC-8 | CC-9 |
| BS | 0.10 | 0.29 |
| MEK | 86.16 | 59.89 |
| Empera ™ 171M | 7.42 | 21.49 |
| Zylar ™ 631 | 1.11 | 3.22 |
| LAD-6B | 1.00 | 2.90 |
| Sartomer ™ CD561 | 3.01 | 8.71 |
| TPO | 1.20 | 3.50 |

The coating composition CC-8 was then coated with an Elcometer Bird Film Applicator (from ELCOMETER INSTRUMENTS) on both sides of the subbed PET-C support PET2 at a coating thickness of 100 μm and subsequently dried for 15 minutes at 50° C.

The coated sample was partially cured using a Fusion DRSE-120 conveyer, equipped with a Fusion VPS/I600 lamp (D-bulb), which transported the sample under the UV-lamp on a conveyer belt at a speed of 20 m/min for a UV exposure of 250 mJ/m$^2$.

The coated sample was the coated on both sides with the coating composition CC-9 using the Elcometer Bird Film Applicator (from ELCOMETER INSTRUMENTS) at a coating thickness of 100 μm and subsequently dried for 15 minutes at 50° C.

The coated sample was partially cured using a Fusion DRSE-120 conveyer, equipped with a Fusion VPS/I600 lamp (D-bulb), which transported the sample under the UV-lamp on a conveyer belt at a speed of 20 m/min for a UV exposure of 250 mJ/m$^2$.

On both sides of the coated sample, a thermoadhesive layer was coated using a coating composition CC-10 according to Table 10. The coating was performed with the Elcometer Bird Film Applicator (from ELCOMETER INSTRUMENTS) at a coating thickness of 80 μm and then subsequently dried for 15 minutes at 50° C.

TABLE 10

| Components of CC-10 | wt % |
|---|---|
| MEK | 87.5 |
| UCAR ™ VAGD | 12.5 |

The coated sample was cured using a Fusion DRSE-120 conveyer, equipped with a Fusion VPS/I600 lamp (D-bulb), which transported the sample three times under the UV-lamp on a conveyer belt at a speed of 20 m/min for a UV exposure of 250 mJ/m$^2$, to deliver the double side laser markable security film SF-6.

Preparation of Overlay OV-1

The coating compositions SUB-3 and SUB-4 were prepared by mixing the components according to Table 11, respectively Table 12 using a dissolver.

TABLE 11

| Components of SUB-3 | mL |
|---|---|
| water | 666.0 |
| VIN1 | 189.0 |
| PEDOT/PSS | 82.3 |
| KIESELSOL ™ 100F | 17.5 |
| Mersol | 45.0 |

TABLE 12

| Components of SUB-4 | g |
|---|---|
| water | 939.9 |
| 26% NH4OH solution in water | 0.3 |
| Kelzan ™ S | 0.3 |
| PEDOT/PSS | 30.0 |
| KIESELSOL ™ 100F | 0.6 |
| Zonyl ™ FSO100 | 0.6 |
| Poligen ™ WE7 | 0.2 |
| PMMA | 30.1 |

A 1100 μm thick polyethylene terephthalate sheet was first longitudinally stretched and then coated on one side with the coating composition SUB-3 to a wet thickness of 9 μm. After drying, the longitudinally stretched and coated polyethylene terephthalate sheet was transversally stretched to produce a 63 μm thick sheet, which was then coated on the same side of the SUB-3 subbing layer with the coating composition SUB-4 to a wet thickness of 33 μm. The resulting layers were transparent and glossy.

An adhesive composition was prepared by mixing 50 g of Liofol™ UR 3640, a polyurethane solvent (ethyl acetate) adhesive, with 1 g of Liofol™ hardener UR 6800. The adhesive composition was applied using a Braive coating apparatus with a wire-rod to a wet thickness of 20 μm on top of the subbing layer made with the coating compositions SUB-4, was applied using a Braive coating apparatus with a wire-rod to a wet thickness of 20 μm, and dried at 50° C. for 2 minutes. The adhesive layer-coated side of the overlay were then laminated to a 35 μm PETG sheet (Rayopet from AMCOR) using a cold roll laminator to deliver the overlay OV-1.

Preparation of Security Document SD-8 and Results

The symmetrical double side laser markable security film SF-6 was simultaneously laminated on one side with a 500 μm Opaque PETG core and on the other side to the PETG side of the overlay OV-1 by a Laufferpress LE laminator using the settings 10 minutes at 130° C. with 125N A4 size in order to deliver the security document SD-8.

A test image containing a wedge with different grey-levels (six squares of 9×9 mm) was laser marked on the security document SD-8, using a Rofin RSM Powerline E laser (10 W) with settings 29 ampere and 22 kHz. The maximum optical density measured in square 6 (RGB-values=12 of this area in the bitmap-image) was 1.23.

After destruction of the laser marked Security Document by delamination of the overlay and removal of the layers between the 63 μm PETC and the 500 μm Opaque PETG core, a ghost image became visible on the outermost laser markable layer having an optical density of 0.07.

The invention claimed is:

1. A transparent security film including in order:

a) a biaxially oriented polyethylene terephthalate support SUP;

b) a subbing layer SL1; and c) a laser markable layer LML comprising:

i) carbon black having an average particle size of less than 300 nm as a laser additive, wherein the carbon black is present in an amount of less than 0.08 wt % based on the total weight of the laser markable polymer or polymers; and ii) a laser markable polymer or polymers selected from the group consisting of polystyrene, polycarbonate and styrene acrylonitrile.

2. The security film according to claim 1 wherein the laser markable polymer in the laser markable layer LML is polystyrene.

3. The security film according to claim 1, further containing a thermo adhesive layer TAL on top of the laser markable layer LML.

4. The security film according to claim 2, further containing a thermo adhesive layer TAL on top of the laser markable layer LML.

5. The security film according to claim 1, further containing a subbing layer SL2 on the support SUP on the other side of the support SUP than the side having the subbing layer SL1 and with a thermo adhesive layer TAL on top of the subbing layer SL2.

6. The security film according to claim 3, wherein the thermo adhesive layer TAL contains a copolymer of vinylchloride, vinylacetate and vinylalcohol.

7. The security film according to claim 4, wherein the thermo adhesive layer TAL contains a copolymer of vinylchloride, vinylacetate and vinylalcohol.

8. The security film according to claim 5, wherein the thermo adhesive layer TAL contains a copolymer of vinylchloride, vinylacetate and vinylalcohol.

9. The security film according to claim 1, wherein the polyethylene terephthalate support SUP has a thickness of 100 μm or less.

10. The security film according to claim 1, wherein a second laser markable layer is present on the other side of the support SUP than the side having the laser markable layer LML.

11. A security document containing the security film according claim 1.

12. A security document containing the security film according claim 2.

13. The security document according to claim 11 containing security print visible through the laser markable layer LML.

14. The security document according to claim 12 containing security print visible through the laser markable layer LML.

15. The security document according to claim 11 containing a white support or layer.

16. The security document according to claim 12 containing a white support or layer.

17. A method for preparing a security film according to claim 1 comprising the steps of:

a) providing the transparent biaxially oriented polyethylene terephthalate support SUP having a subbing layer SL1; and b) coating the laser markable layer LML on the subbing layer SL1 using a composition comprising:

i) one or more polymers selected from the group consisting of polystyrene, polycarbonate and styrene acrylonitrile; and ii) the laser additive.

* * * * *